Figure 1:
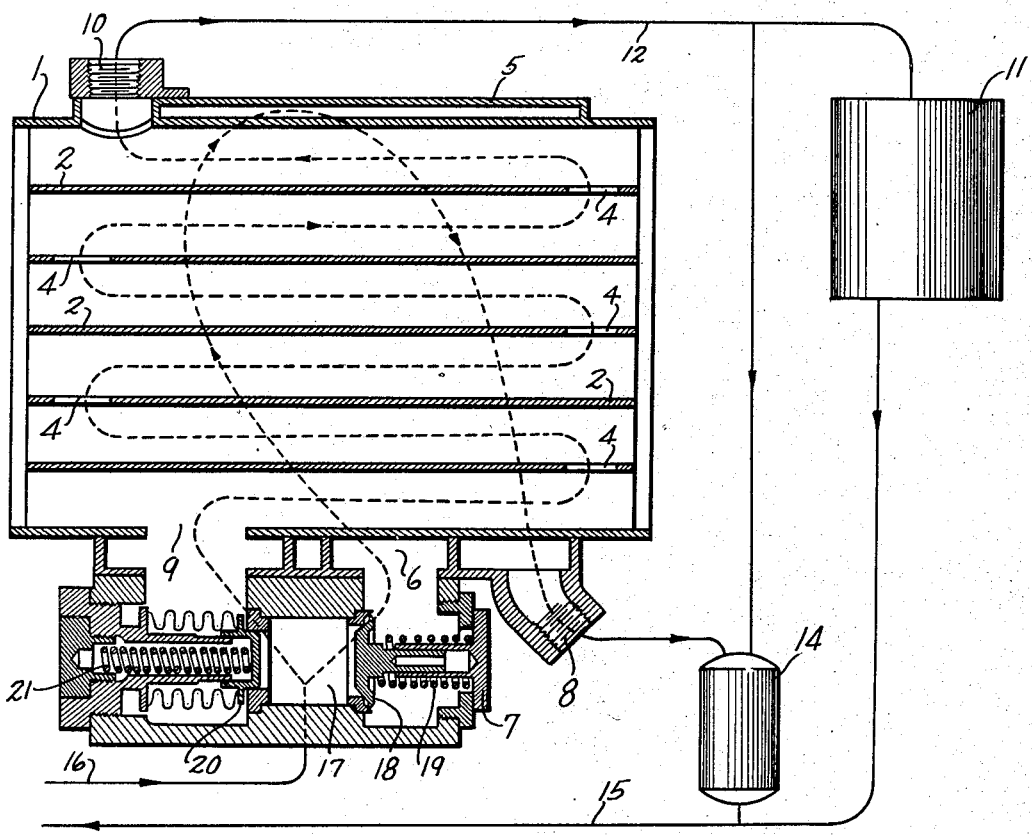
Figure 2:
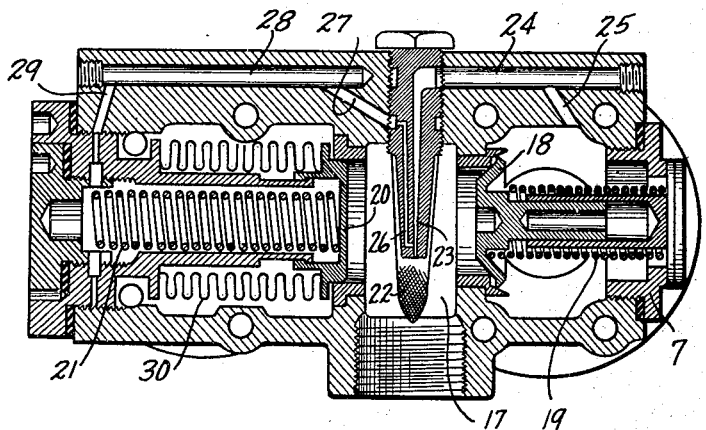
Figure 3:
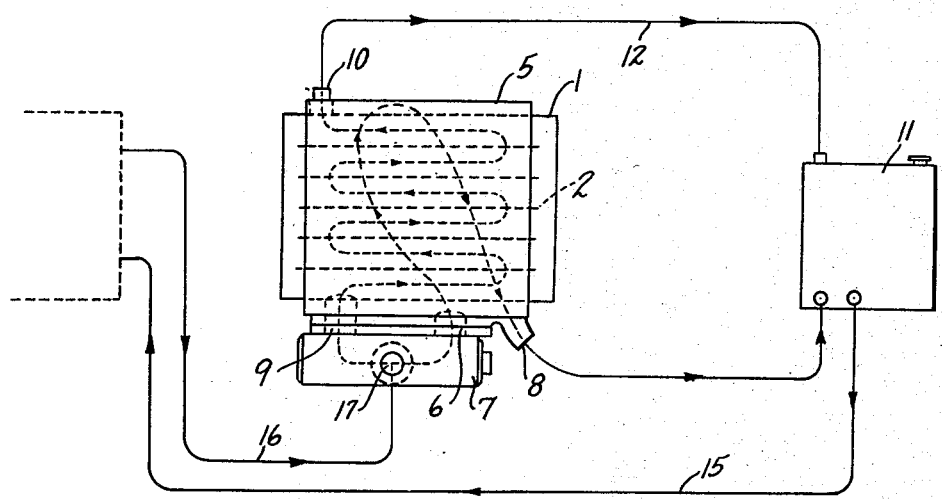
Figure 4:
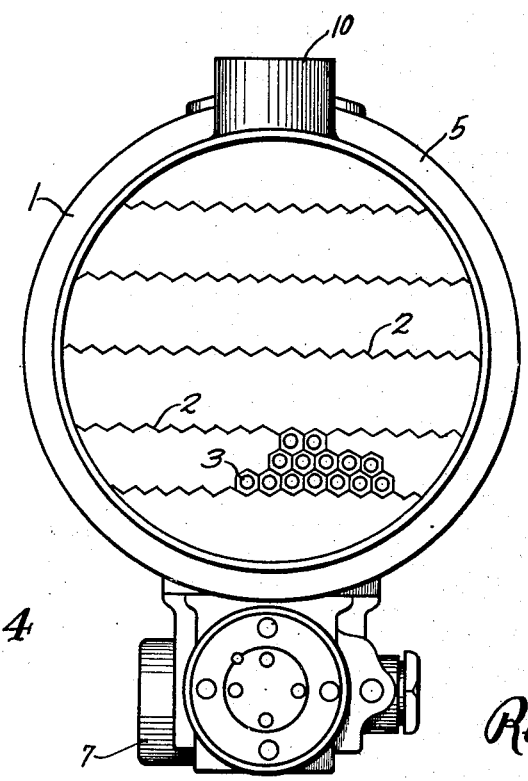

Oct. 12, 1943.    R. G. DYKEMAN    2,331,378
OIL TEMPERATURE REGULATOR
Filed Dec. 18, 1940    2 Sheets-Sheet 1

Reuben G. Dykeman
INVENTOR
BY C. B. Stevens
ATTORNEY

Oct. 12, 1943.　　　R. G. DYKEMAN　　　2,331,378
OIL TEMPERATURE REGULATOR
Filed Dec. 18, 1940　　　2 Sheets-Sheet 2

Reuben G. Dykeman
INVENTOR
BY C. B. Stevens
ATTORNEY

Patented Oct. 12, 1943

2,331,378

UNITED STATES PATENT OFFICE 2,331,378

OIL TEMPERATURE REGULATOR

Reuben G. Dykeman, Dayton, Ohio

Application December 18, 1940, Serial No. 370,671

4 Claims. (Cl. 257—2)

This invention pertains to a lubricant conditioning apparatus, and particularly to a heat exchange unit constructed and arranged to maintain the lubricant at the proper temperature, and consequently at the desired viscosity. While the invention here disclosed is particularly described in connection with lubricating systems of aircraft engines, it is to be understood that the heat exchange unit, as such, is not limited thereto but is equally applicable to the lubricating systems of power units used for other purposes.

Due to the development of high speed motors, and especially such as are used in airplanes, and more recent types of automobile and boat motors, it has been found desirable to condition the lubricating oil to the proper viscosity for most efficient and economic functioning and use in a minimum of time. The operating parts of such motors function at a high rate of speed from initial starting, and it is important that all moving parts thereof be properly lubricated from that moment, or as near to such moment as possible. The rate of oil flow to and over the parts to be lubricated is directly proportional to the viscosity of the oil.

Lubricating oil is quite sensitive to thermal change and tends to thicken and congeal, particularly in the heat exchange unit, when the motor or other apparatus with which the system is used is at or substantially at rest. The flow of oil at the moment of initial starting of the motor is therefore quite slow, and continues so until the oil in the entire flow circuit is brought to the desired temperature and viscosity.

The present invention provides a radiator or cooler unit for an oil circulatory system which embodies two alternative flow circuits or paths wholly independent of each other, and including a bypass path through which the lubricant is initially circulated and a main path through which the lubricant is subsequently circulated, the initial or bypass path being in such proximity with the main flow path that the heat absorbed by the lubricant in passing through the motor is transferred to any lubricant which may lay in the main flow path in a congealed condition and thereby change the viscosity of the oil in the main flow path for subsequent free flow of lubricant therethrough for thermal conditioning by a coolant before its return to the motor.

One object of the invention is to provide a heat exchange unit for an oil circulatory system which is of simple construction, capable of being economically manufactured, and which will be efficient in operation, uniform in action, and unlikely to get out of repair.

A further object of the invention is to provide a heat exchange unit for an oil circulatory system of such construction and arrangement as to rapidly condition the oil and maintain the oil at the proper temperature and viscosity for the most efficient and economic functioning and use.

A further object of the invention is to provide, in combination with a suitable flow circuit and control means, a heat exchange unit for lubrication systems which includes means for quickly and automatically thawing congealed lubricant and relieving congestion within the heat exchange unit, and thereafter maintaining a substantially equalized temperature in the lubricant.

A further object of the invention is to provide a heat exchange unit for an oil circulatory system which includes alternate wholly independent flow paths, and which will adapt the heat exchange unit to a circulatory system including a bypass wherein a small quantity of the oil may be used over and over again until the remainder of the oil supply is brought to the proper temperature and viscosity condition.

With the above primary and other incidental objects in view, as will be more fully apparent in the specification, the invention consists of the features of construction, the parts and combinations thereof, and the mode of operation, or its equivalent, as described and set forth in the claims.

Referring to the accompanying drawings wherein is shown the preferred but obviously not necessarily the only form of embodiment of the invention, Fig. I is a sectional view showing the combination of the heat exchange unit embodying the present invention and an oil flow control means wherein the flow of oil through the heat exchange unit is controlled by the viscosity of the oil, together with a diagrammatic illustration of an oil flow circuit.

Fig. II is a sectional plan view of the oil flow control unit shown in Fig. I.

Fig. III is a diagrammatic view showing a complete oil circulatory system, there being shown in this diagrammatic view a modified form of warm-up circuit.

Fig. IV is an end elevation of the heat exchange unit shown in Figs. I and III.

Like parts are indicated by similar characters of reference throughout the several views.

Referring to the drawings, I is a radiator or heat exchange unit which for illustrative purposes is shown as being of the tubular air cooled type such as is commonly used in automobile radiators. The radiator consists of a cylindrical shell preferably although not necessarily divided by baffles 2 into a succession of compartments, and filled with tubes 3 (Fig. IV) disposed in parallel relationship and open at their ends for circulation of air therethrough and spaced apart along their length to afford circulatory passages therebetween intermediate their ends. Interconnecting ports 4 are provided between the compartments formed by the baffles 2 at alternating ends of the radiator or heat exchange unit. Obviously, forms of construction other than the tubular form illustrated may be utilized, or for stationary installations a water cooled or similar type of heat exchange unit may be employed.

Surrounding the radiator or cooler unit in which the lubricating oil is subjected to a coolant medium is a jacket 5 forming about the main flow passages or core just described on annular bypass through which oil may flow under certain predetermined temperature and viscosity conditions as will be hereinafter apparent. The jacket 5 is connected to an inlet chamber 6 of a flow control mechanism 7 and it is provided with an outlet 8 leading therefrom. An inlet port 9 connects the flow control mechanism 7 with the main or baffled passage through the radiator unit and an outlet 10 connects the main baffled passage of the radiator unit to a main supply tank 11 by suitable piping 12, diagrammatically illustrated on Figs. I and III.

As shown in Fig. I the outlet 8 of the jacket 5 is connected by suitable piping to an auxiliary reservoir 14 which, in turn, is suitably connected to a conduit or piping 15 leading to the motor. A suitable conduit or piping 16 leads from the motor to a common chamber 17 in the flow control mechanism from which such oil flow is in accordance with its viscosity and temperature conditions to the inlet 6 or the inlet 9 of the heat exchange unit. Thus, there is provided a bypass circuit including the jacket 5 and a main circuit including the storage tank 11 and alternate flow paths through the radiator or heat exchange unit which are wholly independent of each other.

Referring to Figs. I and II, the flow control mechanism 7 includes the main oil inlet chamber 17 to which the conduit or piping 16 from the motor leads, and two valves respectively controlling the flow to the inlet 9 and the main passage through the radiator unit and the inlet 6 for the jacket 5. Valve 18 which controls the flow to the jacket 5 is of the constant pressure relief type and is constantly urged toward and into closed position by a spring 19 surrounding the valve stem so that the valve will remain closed and shut off flow from the inlet chamber 17 to the jacket 5 so long as pressure in the inlet chamber is insufficient to overcome the compression resistance of the spring 19.

A valve 20 controls the flow of lubricant from the main inlet chamber 17 through the inlet 9 and the main circulatory baffled passage of the radiator unit. Flow valve 20 is urged toward closed position and shuts off flow through the main baffled passage of the radiator unit so long as the pressure in the inlet chamber 17 is less than the compression resistance of the spring 21. The spring 21 has a lesser compression resistance value than the spring 19, and in order that the valves 18 and 20 may properly regulate the oil flow through the main or bypass passages in accordance with the viscosity of the oil, means are provided for supplementing the resistance of the spring 21 in proportion to the viscosity of the oil.

In an oil circulating system the oil, which is thermally sensitive, becomes more and more viscous as the temperature thereof decreases, and it is most important that the temperature of the oil be raised and the viscosity reduced as quickly as possible both for oil flow and lubrication purposes. In the circulatory system here illustrated, assuming the only oil bypass to be from the mechanism to be lubricated through the main baffled oil passage of the unit and thence back to the mechanism to be lubricated, the flow of oil would naturally be retarded if not completely blocked by the congealed oil in the radiator passages.

In the operation of the illustrated circulatory system, including the oil flow control mechanism and the heat exchange unit, oil is circulated through the system by a pump or other pressure producing means, and flows from the motor into the inlet chamber 17 of the flow control mechanism 7. Then, depending upon the viscosity of the oil, and thereby the pressure built up in the chamber 17, the valve 18 or the valve 20 is selectively opened to permit oil flow through the bypass or the main circulatory system hereinbefore described, and hence through the jacket 5 or the main baffled passage of the radiator unit as illustrated.

As shown in Fig. II, the inlet chamber 17 contains a venturi or an orifice and friction tube assembly surrounded by a screen 22. The main passage 23 bleeds oil from the inlet chamber 17 to the inlet chamber 6 of the jacket 5 through suitable conduits 24 and 25. Such passage 23 is continually open. A port and associated conduit 26 which is shown as being relatively small as compared to the main passage 23 of the venturi leads from a point adjacent the inlet end of the passage 23 through conduits 27, 28, and 29 to a point behind the valve 20 and within a chamber formed by bellows 30 suitably connected to and disposed rearwardly of the valve 20. As will be well understood, pressure produced by resistance to flow through the Venturi tube 23 as a result of varying conditions in viscosity of the oil will be transmitted in the form of static pressure to the bellows 30 and the rearward face of the valve 20 and augment the compression resistance of the spring 21 and vary the resistance to opening of the valve 20 as a result of pressure in the chamber 17.

Assuming both of the valves 18 and 20 to be normally held closed by the springs 19 and 21, oil at low temperature and high viscosity entering the chamber 17 under pressure will pass the valve 20 until resistance to flow through the venturi 23 builds up sufficient static pressure to augment the spring 21 and increase the resistance to opening of the valve 18 and will continue to augment the spring 21 until the resistance to opening of the valve 20 is greater than that of the valve 18. As the resistance forces against the valves 18 and 20 reach an equilibrium, the valves 18 and 20 will be in balanced relation, and any resistance to opening of the valve 20 becomes greater than resistance to opening of valve 18, valve 20 will close and valve 18 will open. Opening of valve 18 permits the oil under pressure to pass through the jacket 5 surrounding the main baffled passage of the radiator unit and through the bypass circuit which does not include the main oil tank 11.

Thus, a small amount of oil will be used over and over again, and the heat absorbed by such oil from the engine will be transmitted to the oil in the main baffled passages of the radiator unit and thaw such unit in the event that it is congealed.

As the oil becomes warmer and less viscous, the resistance to flow of oil through the venturi 23 will correspondingly decrease and the degree of static pressure which augments the resistance of the spring 21 will correspondingly reduce, and when the resistance to opening of the valve 20 becomes less than that of the valve 18, the valve 18 will close and the valve 20 will open and the oil flow will be through the main baffled passage of the radiator and the complete circuit which includes the tank 11. Should the oil become cold, the valves 18 and 20 will again close and open respectively as first described. Thus, there is provided a control device which will selectively direct the oil to the jacket 5 or the main baffled passage of the radiator unit in accordance with the viscosity of the oil.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described my invention what I claim is:

1. A device of the character described for use in a lubricant circulatory system of an engine, including a body having an inlet and an outlet, said body having a high resistance lubricant flow passage and a coolant passage therethrough disposed in heat exchange relationship to each other, a warming jacket having an inlet and an outlet independent of the inlet and outlet of the body, said warming jacket having a low resistance lubricant flow passage therethrough disposed in heat exchange relationship with the high resistance lubricant flow passage of the body, a lubricant conduit connected to each of said lubricant flow passages, a plurality of independent pressure operated means each normally biased toward closing position in said lubricant conduit for controlling the passage of lubricant to either the high resistance or the low resistance lubricant flow passage in accordance with the viscosity of the lubricant, and means connected to one of said pressure operated means so as to increase the closing bias thereon in response to increase in pressure induced by the change in viscosity of the lubricant flowing through the lubricant conduit.

2. A fluid temperature control for use in a lubricant circulatory system of an engine, including a body having an inlet and an outlet, said body having a high resistance lubricant flow passage and a coolant passage therethrough disposed in heat exchange relationship to each other, a warming jacket having an inlet and an outlet independent of the inlet and outlet of the body, said warming jacket having a low resistance lubricant flow passage therethrough disposed in heat exchange relationship with the high resistance lubricant flow passage of the body, said lubricant flow passages being free of fluid communication with each other, means for conducting a lubricant to each of said passages, a pair of independent pressure operated valves each normally biased toward closing position in said conducting means for controlling the flow of lubricant to either the high resistance or the low resistance lubricant flow passage in accordance with the viscosity of the lubricant, and means connected to the valve controlling the flow of lubricant through the high resistance passage for increasing the closing bias thereon in response to increase in pressure induced by the variation in viscosity of the lubricant flowing through the lubricant conducting means.

3. A device of the character described for use in a lubricant circulatory system of an engine, including a body having an inlet and an outlet, said body having a high resistance lubricant flow passage and a coolant passage therethrough disposed in heat exchange relationship to each other, a warming jacket having an inlet and an outlet independent of the inlet and outlet of the body, said warming jacket having a low resistance lubricant flow passage therethrough disposed in heat exchange relationship with the high resistance lubricant flow passage of the body, said lubricant flow passages being free of fluid communication with each other, means for conducting a lubricant to each of said passages, an independent pressure operated valve in each of said lubricant flow passages each normally biased toward closing position for controlling the flow of lubricant to its respective lubricant flow passage in accordance with the viscosity of the lubricant, and means connected to the valve controlling the flow of lubricant through the high resistance passage for increasing the closing bias thereon in response to increase in pressure induced by the variation in viscosity of the lubricant flowing through the lubricant conducting means.

4. A device of the character described for use in a lubricant circulating system of an engine, including a body having an inlet and an outlet, said body having a lubricant flow passage and a coolant passage therethrough disposed in heat exchange relationship to each other, a warming jacket having an inlet and an outlet independent of the inlet and outlet of the body, said warming jacket having a lubricant flow passage therethrough disposed in heat exchange relationship with the lubricant flow passage of the body, said lubricant flow passages being free of fluid communication with each other, means for conducting a lubricant to each of said lubricant flow passages, a plurality of independent pressure operated means each normally biased toward closing position for controlling the passage of lubricant to either of the lubricant flow passages in accordance with the viscosity of the lubricant, and means connected to one of said pressure operated means so as to increase the closing bias thereon in response to increase in pressure induced by the change in viscosity of the lubricant flowing through said lubricant conducting means.

REUBEN G. DYKEMAN.